United States Patent
Wen et al.

(10) Patent No.: US 7,423,960 B2
(45) Date of Patent: Sep. 9, 2008

(54) ORTHOGONAL FREQUENCY DIVISION MULTIPLEXING (OFDM) EQUALIZER

(75) Inventors: Kuei-Ann Wen, 1001, TaShueh Rd., HsinChu (TW); Chia-Sheng Peng, HsinChu (TW); Yuan-Shin Chuang, HsinChu (TW)

(73) Assignee: Kuei-Ann Wen, HsinChu (TW)

( * ) Notice: Subject to any disclaimer, the term of this patent is extended or adjusted under 35 U.S.C. 154(b) by 871 days.

(21) Appl. No.: 10/745,754

(22) Filed: Dec. 27, 2003

(65) Prior Publication Data

US 2005/0157636 A1    Jul. 21, 2005

(51) Int. Cl.
H04J 11/00    (2006.01)
G06F 7/38    (2006.01)

(52) U.S. Cl. ........................... 370/208; 708/442
(58) Field of Classification Search ................. 370/203, 370/208; 703/313, 442, 622; 455/67.13
See application file for complete search history.

(56) References Cited

U.S. PATENT DOCUMENTS 6,772,181 B1 *  8/2004  Fu et al. ..................... 708/313
6,874,006 B1 *  3/2005  Fu et al. ..................... 708/442
6,922,549 B2 *  7/2005  Lyons et al. ............. 455/67.13
7,203,718 B1 *  4/2007  Fu et al. ..................... 708/622

* cited by examiner

*Primary Examiner*—Firmin Backer
*Assistant Examiner*—David Oveissi
(74) *Attorney, Agent, or Firm*—Venable LLP; Raymond J. Ho

(57) ABSTRACT

A novel and simplified orthogonal frequency division multiplexing (OFDM) equalizer uses a coordinate rotation digital computer (CORDIC) to convert the estimated channel effects from rectangular coordinate to polar coordinate and to compensate the phase error with the same CORDIC circuit of synchronization. The OFDM equalizer comprises: a fast Fourier transformer (FFT); a channel estimation circuit; a coordinate translator, comprising a CORDIC circuit, to translate the channel estimation value into a polar coordinate value; a pilot extractor to extract pilot signals and to track minor phase offsets of the received signal to synchronize phase of said received signal; a phase rotator to compensate phase of the received signal according to the channel estimation value and the phase tracking estimation value, to generate the real value and imaginary value of the phase compensated signal; and an amplitude adjustment circuit. The coordinate translator and the phase rotator use the same CORDIC circuit.

4 Claims, 1 Drawing Sheet

ORTHOGONAL FREQUENCY DIVISION MULTIPLEXING (OFDM) EQUALIZER

FIELD OF THE INVENTION

The present invention relates to an orthogonal frequency division multiplexing (OFDM) equalizer, especially to an orthogonal frequency division multiplexing equalizer using a coordinate rotation digital computer (CORDIC).

BACKGROUND OF THE INVENTION

The orthogonal frequency division multiplexing (OFDM) technique has been widely used in the processing of signals. An OFDM circuit provides good bandwidth efficiency and good resistance to multi-path fading channel by means of dividing the full bandwidth into a plurality of small sub-channels. If compared with the technology using coherent bandwidth, the small sub-channels can be viewed as flat fading channels so that one-tap equalizers can be used to recover amplitudes and phases of signals more efficiently. The one-tap frequency-domain equalizer estimates and compensates channel effects with less complexity than time-domain equalizer.

A signal received by an OFDM equalizer is consisted of its signal component and its channel component. The channel component comprises the multi-path channel effects and other channel parameters practically including filter response delay, phase noise, carrier frequency offset and timing offset. In the conventional OFDM systems such as WLAN ETSI 802.11a/g and ETSI HiperLan/2, it is necessary to use known signals as preamble signals to conduct channel estimation and channel compensation, so that the signal component may be recovered. In a short-range communication system, such in the indoor model, the equalization of signals may further take the advantage of the correlation properties of neighboring sub-channels to improve the channel estimation effects.

Signals received by an OFDM equalizer may be expressed by the following equation:

$$\hat{Y}_{k,l} = X_{k,l}/\hat{H}_k \quad (1)$$

wherein $X_{k,l}$ represents the received signals of the lth OFDM symbol at the kth sub-channel, $\hat{Y}_{k,l}$ is its signal component and $\hat{H}_k$ is its channel effect.

The channel effect $\hat{H}_k$ is a complex value and may be expressed by:

$$\hat{H}_k = \hat{H}_{re,k} + j \cdot \hat{H}_{im,k} \quad (2)$$

wherein $\hat{H}_{re,k}$ is its real value and $\hat{H}_{im,k}$ is its imaginary value.

As a result, the received signal may be expressed as:

$$\hat{Y}_{k,l} = X_{k,l}/\hat{H}_k = X_{k,l}/(\hat{H}_{re,k} + j \cdot \hat{H}_{im,k})$$

So we have:

$$\hat{Y}_{k,l} = \frac{X_{k,l}(\hat{H}_{re,k} - \hat{H}_{im,k})}{\hat{H}_{re,k}^2 + \hat{H}_{im,k}^2} \quad (3)$$

In order to compensate the channel effect, a complex-valued divider is needed. A circuit to conduct the equalization of the received signals, four real-valued multipliers and two real-valued dividers are deeded for each sub-carrier. Such a circuit is complicated, occupies a larger space and is costly in design and manufacture.

OBJECTIVES OF THE INVENTION

The objective of this invention is to provide a novel OFDM equalizer with simplified structure.

Another objective of this invention is to provide a compact and less expensive OFDM equalizer.

Another objective of this invention is to provide an OFDM equalizer wherein no multiplier is needed.

Another objective of this invention is to provide an OFDM equalizer using a CORDIC circuit.

SUMMARY OF THE INVENTION

According to this invention, a novel and simplified orthogonal frequency division multiplexing (OFDM) equalizer is provided. The OFDM equalizer of this invention uses a coordinate rotation digital computer (CORDIC). The OFDM equalizer converts the estimated channels from rectangular coordinate to polar coordinate with the CORDIC circuit, compensates the phase error with the same CORDIC circuit of synchronization, and adjusts the amplitude of the received signal. The OFDM equalizer comprises: a fast Fourier transformer (FFT), to conduct Fourier transformation to received signals to obtain frequency components of the received signals; a channel estimation circuit to estimate channel effects of received signals as transformed by the FFT to generate a channel effect estimation value; a coordinate translator, comprising a CORDIC circuit, to translate the channel estimation value into a polar coordinate value; a pilot extractor, provided downstream to the FFT 11, to extract pilot signals and to track minor phase offsets of the received signal to synchronize phase of said received signal; a phase rotator to compensate phase of the received signal according to the channel estimation value and the phase tracking estimation value, to generate the real value and imaginary value of the phase compensated signal; and an amplitude adjustment circuit to adjust amplitude of the compensated signal according to the amplitude adjustment value of the channel effect estimation value of the channel estimation circuit. In the present invention, the coordinate translator and the phase rotator use the same CORDIC circuit.

These and other objectives and advantages of this invention may be clearly understood from the detailed description by referring to the following drawings.

DETAILED DESCRIPTION OF THE INVENTION

Figure 1:
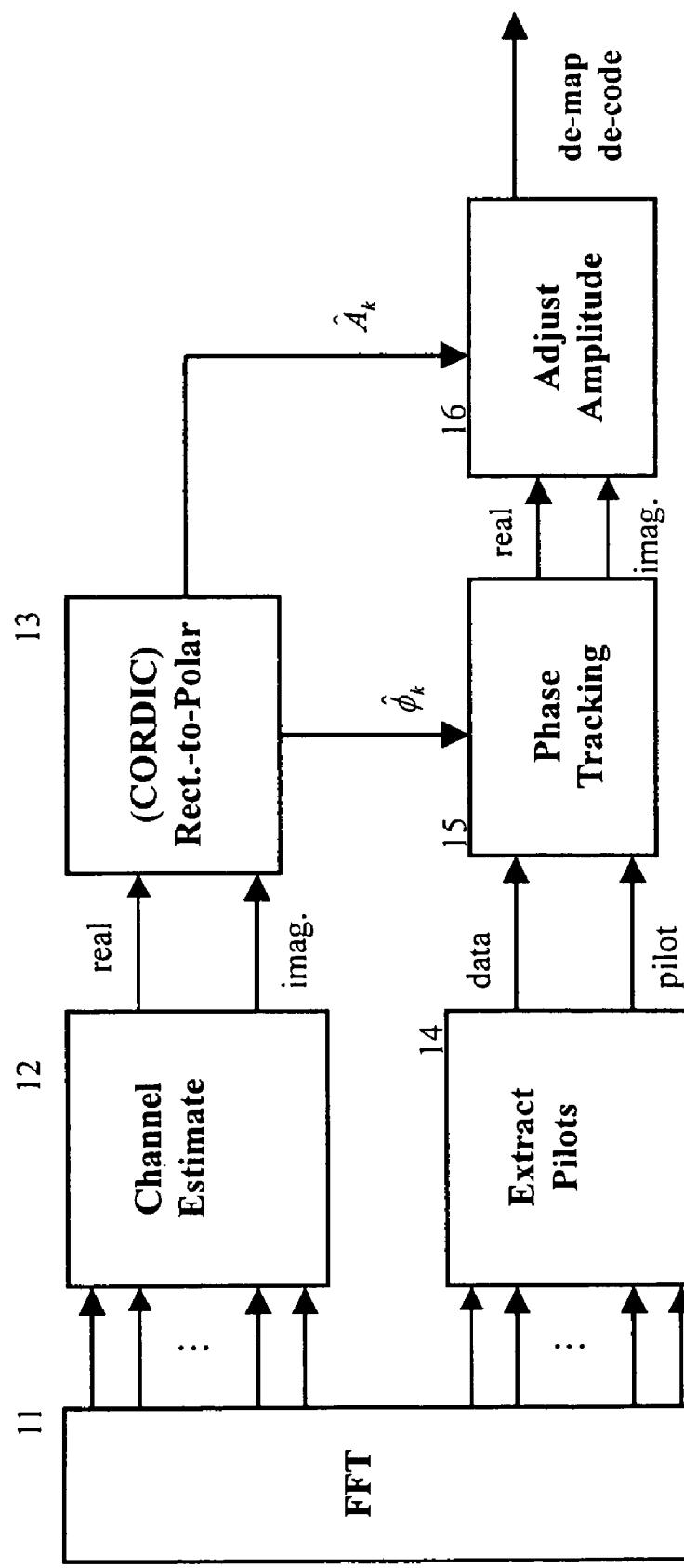
FIG. 1 illustrates the block diagram of the OFDM equalizer of this invention.

The present invention discloses a novel structure of the orthogonal frequency division multiplexing (OFDM) equalizer.

It has been found that the channel effect of received signals may be expressed by an amplitude value and a phase value, as follows:

$$\hat{H}_k = \hat{H}_{re,k} + j \cdot \hat{H}_{im,k} = \hat{A}_k e^{j\hat{\phi}_k} \quad (4)$$

wherein $\hat{A}_k$ is its amplitude and $\hat{\phi}_k$ is its phase.

Similarly, the received signals may also be expressed by an amplitude value and a phase value, as follows:

$$\hat{Y}_{k,l} = \frac{X_{k,l}(\hat{H}_{re,k} - \hat{H}_{im,k})}{\hat{H}_{re,k}^2 + \hat{H}_{im,k}^2} e^{-j\hat{\theta}_{k,l}} = \frac{1}{\hat{A}_k} X_{k,l} e^{-j(\hat{\phi}_k + \hat{\theta}_{k,l})} \quad (5)$$

wherein $\hat{\theta}_{k,l}$ is the compensative phase value at the lth OFDM tracking stage.

From the above description, it can be seen that the channel effect consists an amplitude error and a phase error and that, as a result, the estimated amplitude and the phase of the received signals may be compensated separately. In conducting such compensation, only two real-valued dividers and one phase rotator are needed. The complex-valued divider as used in the conventional OFDM equalizer may thus be replaced by two real-valued dividers and a phase-rotator.

Although it is not intended to limit the scope of this invention, in the conventional art the CORDIC (coordinate rotation digital computer) has been proven useful in providing the function of synchronization in OFDM receivers. Besides the synchronization function, the CORDIC may be used to translate between rectangular coordinates and polar coordinates. In the present invention, a coordinate rotation digital computer (CORDIC) is used to eliminate the complex-valued divider as used in the conventional OFDM equalizer. According to the present invention, the OFDM equalizer converts the estimated channels from rectangular coordinate to polar coordinate with the CORDIC circuit, compensates the phase error with the same CORDIC circuit of synchronization, and adjusts the amplitude of the received signal.

FIG. 1 illustrates the block diagram of the OFDM equalizer of this invention. As shown in this figure, the OFDM equalizer of this invention comprises: a fast Fourier transformer (FFT) 11, to conduct Fourier transformation to received signals to obtain samples of the received signals; a channel estimation circuit 12 to estimate channel effects of a received signal as transformed by the FFT 11 to generate a channel effect estimation value; a coordinate translator 13, comprising a CORDIC circuit, to translate the channel estimation value into a polar coordinate value; a pilot extractor 14, provided downstream to the FFT 11, to extract pilot signals and to track minor phase offsets of the received signal to synchronize phase of said received signal; a phase rotator 15 to compensate phase of the received signal according to the channel estimation value and the phase tracking estimation value, to generate the real value and imaginary value of the phase compensated signal; and an amplitude adjustment circuit 16 to adjust amplitude of the compensated signal according to the amplitude adjustment value of the channel effect estimation value of the channel estimation circuit 12. In the present invention, the coordinate translator 13 and the phase rotator 15 use the same CORDIC circuit.

In the above-said processing, the channel estimation circuit 12 estimates the channel effects contained in the sample of signal as generated by the FFT 11. In general, the channel effects may be estimated by using any known technology, including the maximum likelihood estimation approach, the least square method, etc. Of course, other technologies suited in the estimation of channel effects according to characteristics or other features of the received signals may be used in this invention. Since they belong to the known art, detailed description thereof is thus omitted. The channel effect as estimated is represented by a complex value, as shown in Formula (2), that is consisted of a real-valued component and an imaginary value component.

The coordinate translator 13 uses a coordinate rotation digital computer (CORDIC) circuit to translate the rectangular coordinate of the channel effect value as generated by the channel estimation circuit 12 into its polar coordinate. The calculation of the CORDIC circuit may be represented by the following formula:

$$\begin{cases} x_{i+1} = k_i[x_i - \mu_i y_i 2^{-1}] \\ y_{i+1} = k_i[y_i + \mu_i x_i 2^{-1}] \\ z_{i+1} = z_i + \mu_i \tan^{-1}(2^{-1}) \end{cases} \quad (6)$$

wherein $x_0$ and $y_0$ are real value and imaginary value of the channel effect estimation value, respectively, $z_i$ is the accumulation of angle value of the ith iteration, $\mu_i$ is decision function and $$k_i = \cos(\tan^{-1}(2^{-i})) = 1/\sqrt{1+2^{-2i}} \quad (7)$$

is CORDIC gain, which may be compensated by a constant multiplier at the last iteration.

In the calculation of the coordinate translator 13, z0 may be set as 0 in the first place and the target value $y_i$ may be set as 0. As a result, after iteration $z_i$ will be the phase angle of the complex value and $x_i$ will be its amplitude (length).

After the iteration, a phase compensation angle value $\hat{\phi}_k$ and an amplitude compensation value $\hat{A}_k$ will be given. They are sent to the phase rotator 15 and the amplitude adjustment circuit 16, respectively.

Sample of the received signal is also sent from the FFT 11 to the pilot extractor 14. The pilot extractor 14 extracts the pilot components from signals after FFT to track phase shifts. The values are given to the phase rotator 15, which uses the same CORDIC circuit of the coordinate translator 13 to compensate the received signal. In conducting the phase compensation, it is possible to set $z_0$ in Formula (6) to 0 and $z_i$ to a target value, such that the phase is rotated to the target angle. Data so obtained are rectangular coordinate value, as its channel effect being compensated. The obtained data are sent to the amplitude adjustment circuit 16.

The amplitude adjustment circuit uses the amplitude compensation value $\hat{A}_k$ generated by the coordinate translator 13 to compensate the amplitude error of the processed signal. In the adjustment process, the processed signal is divided to its real-valued component and to its imaginary-valued component.

In the OFDM equalizer of this invention, no complex-valued divider as used in the conventional OFDM equalizer is used. In the invented OFDM equalizer, only a CORDIC circuit and real-valued dividers are needed. As the CORDIC circuit is useful in the phase compensation circuit of the OFDM equalizer, this invention in fact provides a simplified circuit design for the OFDM equalizer. When used in an equalizer of 10 bit precision, only 5,700 gate count is needed, which is obviously far less than the 17,500 gate count as used in the conventional OFDM equalizer.

As the present invention has been shown and described with reference to preferred embodiments thereof, those skilled in the art will recognize that the above and other changes may be made therein without departing form the spirit and scope of the invention.

What is claimed is:

1. An orthogonal frequency division multiplexing (OFDM) equalizer, comprising:

a fast Fourier transformer (FFT), to conduct Fourier transformation to received signals to obtain samples of the received signals;

a channel estimation circuit to estimate channel effects of a received signal as transformed by the FFT to generate a channel effect estimation value;

a coordinate translator, comprising a dual mode CORDIC circuit, to translate the channel estimation value into a polar coordinate value;

a phase rotator, comprising said dual mode CORDIC circuit, to compensate phase of the received signal according to the channel estimation value, to generate the real value and imaginary value of the phase compensated signal; and an amplitude adjustment circuit to adjust amplitude of the compensated signal according to the amplitude adjustment value of the channel effect estimation value of the channel estimation circuit, wherein said coordinate translator and said phase rotator use the same CORDIC circuit, and wherein translation of coordinate of said channel effect estimation value comprises calculation according to the following formula:

$$\begin{cases} x_{i+1} = k_i[x_i - \mu_i y_i 2^{-1}] \\ y_{i+1} = k_i[y_i + \mu_i x_i 2^{-1}] \\ z_{i+1} = z_i + \mu_i \tan^{-1}(2^{-1}) \end{cases}$$

wherein $x_o$ and $y_o$ are real value and imaginary value of the channel effect estimation value, respectively, $z_i$ is the accumulation of angle value of the ith iteration, $\mu_i$ is decision function and $k_i = \cos(\tan^{-1}(2^{-i})) = 1/\sqrt{1+2^{-2i}}$ is CORDIC gain and i is an integer equal to or greater than 0;

said calculation comprising setting $z_o$ to 0 and the target $y_i$ to 0.

2. The OFDM equalizer according to claim 1, wherein phase rotation of said channel effect estimation value comprises calculation according to the following formula:

$$\begin{cases} x_{i+1} = k_i[x_i - \mu_i y_i 2^{-1}] \\ y_{i+1} = k_i[y_i + \mu_i x_i 2^{-1}] \\ z_{i+1} = z_i + \mu_i \tan^{-1}(2^{-1}) \end{cases}$$

wherein $x_o$ and $x_o$ are real value and imaginary value of the channel effect estimation value, respectively, $z_i$ is the accumulation of angle value of the ith iteration, $\mu_i$ is decision function and $k_i = \cos(\tan^{-1}(2^{-i})) = 1/\sqrt{1+2^{-2i}}$ is CORDIC gain and i is an integer equal to or greater than 0;

said rotation comprising setting $z_o$ to 0 and the target $z_i$ to a predetermined phase.

3. The OFDM equalizer according to claim 2, wherein said predetermine phase of said target $z_i$ is calculated by said coordinate translator.

4. An orthogonal frequency division multiplexing (OFDM) equalizer, comprising:

a fast Fourier transformer (FFT), to conduct Fourier transformation to received signals to obtain samples of the received signals;

a channel estimation circuit to estimate channel effects of a received signal as transformed by the FFT to generate a channel effect estimation value;

a coordinate translator, comprising a dual mode CORDIC circuit, to translate the channel estimation value into a polar coordinate value;

a phase rotator, comprising said dual mode CORDIC circuit, to compensate phase of the received signal according to the channel estimation value, to generate the real value and imaginary value of the phase compensated signal; and an amplitude adjustment circuit to adjust amplitude of the compensated signal according to the amplitude adjustment value of the channel effect estimation value of the channel estimation circuit, wherein said coordinate translator and said phase rotator use the same CORDIC circuit, and wherein phase rotation of said channel effect estimation value comprises calculation according to the following formula:

$$\begin{cases} x_{i+1} = k_i[x_i - \mu_i y_i 2^{-1}] \\ y_{i+1} = k_i[y_i + \mu_i x_i 2^{-1}] \\ z_{i+1} = z_i + \mu_i \tan^{-1}(2^{-1}) \end{cases}$$

wherein $x_o$ and $y_o$ are real value and imaginary value of the channel effect estimation value, respectively, $z_i$ is the accumulation of angle value of the ith iteration, $\mu_i$ is decision function and $k_i = \cos(\tan^{-1}(2^{-i})) = 1/\sqrt{1+2^{-2i}}$ is CORDIC gain and i is an integer equal to or greater than 0;

said rotation comprising setting $z_o$ to 0 and the target $z_i$ to a predetermined phase.

* * * * *